United States Patent [19]
Berlinger, Jr.

[11] 3,973,449
[45] Aug. 10, 1976

[54] WINDSHIELD WIPER DRIVE ASSEMBLY

[75] Inventor: Bernard E. Berlinger, Jr., Meadowbrook, Pa.

[73] Assignee: Quaker City Gear Works, Inc., Huntingdon Valley, Pa.

[22] Filed: May 22, 1975

[21] Appl. No.: 579,855

[52] U.S. Cl............................. 74/421 A; 15/250.3; 74/462
[51] Int. Cl.[2]..................... F16H 1/12; F16H 55/06; A47L 1/00; B60S 1/02
[58] Field of Search................. 74/421 A, 462, 460, 74/468, 466; 15/250, 250.3

[56] References Cited
UNITED STATES PATENTS

| | | | |
|---|---|---|---|
| 3,087,078 | 4/1963 | Brown | 74/421 A X |
| 3,247,736 | 4/1966 | Roth | 74/462 |
| 3,434,366 | 3/1969 | Raso et al. | 74/421 A |

Primary Examiner—Leonard H. Gerin
Attorney, Agent, or Firm—John W. Logan, Jr.

[57] ABSTRACT

A drive assembly usable with windshield wipers and the like is disclosed in this application and includes a motor having an output shaft including a helical pinion provided with no more than five teeth. The pinion is in meshing engagement with a helical gear for driving an output shaft connected to a linkage operative to drive a windshield wiper system. The preferred embodiment of the invention disclosed herein includes a pair of bearing assemblies for the motor output shaft, one located adjacent one end of the output shaft and the other located intermediate the ends of the shaft such that a portion of the shaft extends beyond the other bearing assembly. The motor is associated with the output shaft between the bearing assemblies and the helical pinion is located on the extending portion of the shaft.

6 Claims, 3 Drawing Figures

WINDSHIELD WIPER DRIVE ASSEMBLY

This invention relates to drive arrangements and, more particularly, to drive arrangements providing a significant speed reduction and which is particularly useful in windshield wiper systems.

Windshield wiper systems for automobiles, trucks and other motor vehicles generally include a relatively high speed motor, a windshield wiper linkage associated with the windshield wiper arms and a drive arrangement for transferring the output of the motor to the windshield wiper linkage and, thus, the windshield wiper arms. In addition, the drive arrangement functions to reduce the high output speed of the motor to the relatively slow speed of the windshield wiper arms. Thus the drive arrangement generally includes a relatively complex step-down gear train including a motor output pinion driving a combination gear and pinion member which, in turn, drives another output gear and an associated shaft which is connected to the windshield wiper linkage. Obviously, the use of such a large number of gears is relatively expensive not only because of the expense of the extra gears, but also because of the extra bearing and housing costs required to accomodate the gears and their shafts. Moreover, theuse of such a large number of gears reduces the efficiency of the drive arrangement and increases the noise associated with the windshield wiper system.

Accordingly, it is a primary object of this invention to provide a drive arrangement having a high step-down ratio, that utilizes a minimum number of gears and that is particularly useful in windshield wiper systems and the like.

It is another object of this invention to provide a windshield wiper system including a drive arrangement utilizing a minimum number of gears and that is reliable, economical and efficient.

These and other objects of this invention are accomplished by providing a motor having an output shaft including a helical pinion formed with no more than five teeth. The pinion is in meshing engagement with a helical gear member carried on a rotatable shaft which is operatively associated with an arm member including a lug adapted to be connected to a windshield wiper linkage. Bearing assemblies are provided for the motor output shaft and, one of the bearing assemblies is located adjacent one end of the shaft while another bearing assembly is located intermediate its end so that a portion of the shaft extends beyond the other bearing assembly. The motor is associated with its output shaft intermediate the two bearing assemblies, while the helical pinion is carried on the portion of the shaft extending beyond the other bearing assembly.

In one embodiment of the invention the motor output shaft is mounted in cantilever fashion, that is, the end of the shaft adjacent the pinion is unsupported, in another embodiment of the invention the end of the shaft adjacent the pinion is supported in a rotary bearing assembly so that the pinion is straddle mounted between two bearing assemblies.

For a better understanding of the invention, reference is made to the following description taken in conjunction with the figures of the accompanying drawing, in which.

Figure 1:
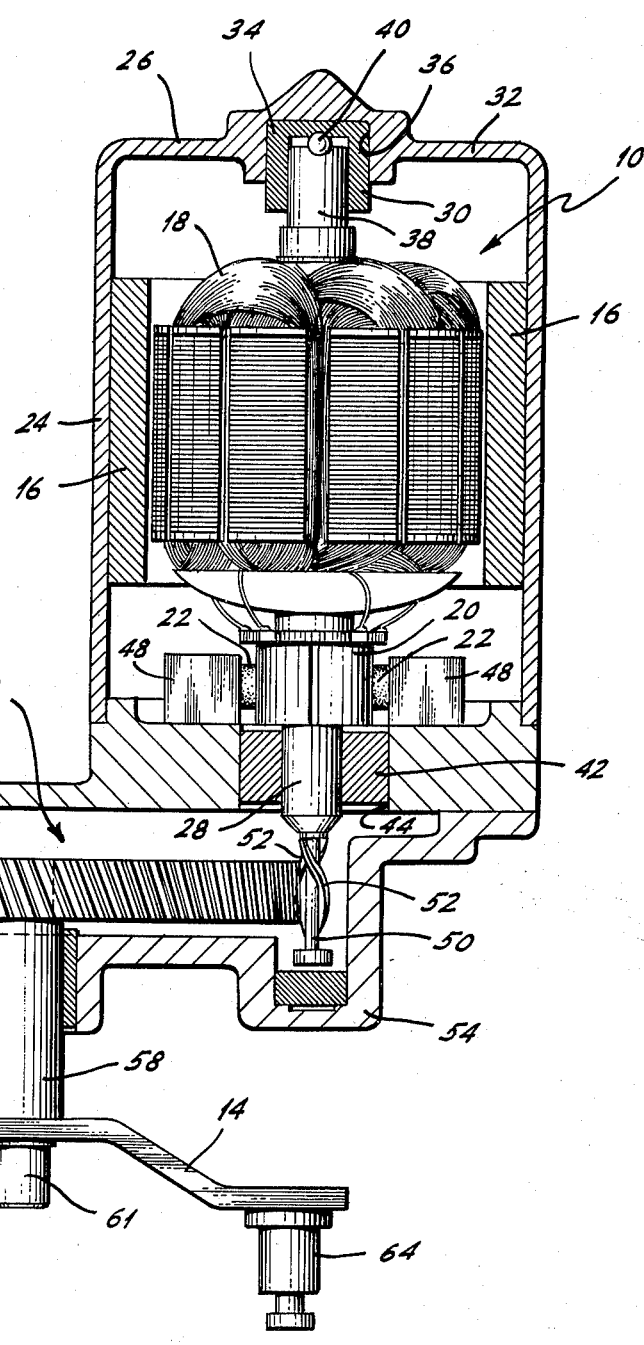
FIG. 1 is a view partly in section of a preferred embodiment of a windshield wiper system in accordance with this invention.

Referring to FIG. 1 of the drawing, a preferred embodiment of the invention is illustrated and includes a motor 10 and a drive arrangement 12 connected to an arm member 14 operatively associated with a generally conventional linkage arrangement (not illustrated) for driving windshield wipers. The motor 10 can be any of various suitable types, but as is generally conventional is an electric motor including magnets 16, an armature 18, a commutator 20 and commutator brushes 22. The magnets 16 comprise the stator portion of the motor and are carried on the inner periphery of the cylindrical wall portion 24 of a cup-shaped motor housing 26. The armature 18 comprises the rotor portion of the motor and is concentrically arranged within the magnet 16 and carried on a rotatable output shaft 28 which comprises the motor output shaft. Also mounted on the shaft 28 is the commutator 20 which, as will be more fully explained hereinafter, is concentrically arranged within the commutator brushes 22. It is merely noted that the magnets 16, the armature 18, the commutator 20 and the brushes 22 are operative in a generally conventional manner to drive the output shaft 28.

One end of the output shaft 28 is carried in a bearing assembly 30 mounted in the end wall 32 of the motor housing 26. The bearing assembly 30 includes both a rotary and thrust bearing arrangement and is thus formed with a cup-shaped rotary bearing member 34 carried in a recess 36 formed in the end wall 32 of the motor housing 26. A reduced diameter portion 38 of the output shaft 28 is received in the rotary bearing member 34 and the end face of the shaft seats on a ball bearing member 40 seated on the end wall of the cup-shaped bearing member 34. With the cup-shaped bearing member 34 and the ball bearing member 40 both rotary and thrust bearings are provided for the output shaft 28 in a relatively economical and reliable manner. However, it should be specifically understood that other bearing assemblies can be utilized if desired.

Another bearing assembly is provided for the output shaft 28 and is in the form of a rotary bearing member 42 mounted in an opening 44 formed in the wall of a gear housing 46 located adjacent the motor housing 26. The rotary bearing member 42 is located intermediate the ends of the output shaft 28 so that a portion of the shaft extends through the bearing member and into the gear housing 46. In the embodiment of the invention disclosed in FIG. 1 of the drawing the output shaft 28 is cantilevered, that is, the end of the output shaft located in the gear housing 46 is unsupported. The motor 10 is located, as noted previously, in the motor housing 26 and, therefore, is located such that the magnets 16, the armature 18, the commutator 20 and the commutator brushes 22 are located between the bearing assembly 30 and the rotary bearing member 42. The brushes 22 are carried on suitable mounting blocks 48 carried on the outer wall of the gear housing 46 so that they are located within the cylindrical housing 26.

Figure 2:
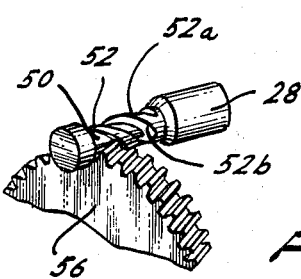
FIG. 2 is a perspective view of a helical pinion usable in the preferred embodiment of the invention, and, FIG. 3 is an enlarged view partly in section of a modified pinion bearing arrangement usable in accordance with this invention.

Between the rotary bearing member 42 and the end of the output shaft 28 located in the gear housing 46, the output shaft includes a pinion 50 which may be integrally formed with the shaft, as illustrated in FIG. 1 of the drawing, or may be a separate member keyed to the shaft. As best seen in FIG. 2 of the drawing, the pinion 50 is formed with two helical teeth 52,52, but could be formed with as many as five teeth and with as few as one tooth. Regardless of the number, however, the teeth 52, 52 are constructed and arranged generally in accordance with the disclosure contained in the U.S. Pat. to Roth, No. 3,247,736, issued Apr. 26, 1966, the disclosure of which is incorporated herein by reference. Briefly summarizing the disclosure of the Roth patent, however, the helical pinion teeth 52, 52 are formed with a relatively flat apex 52a, that is, are not pointed, are formed with continuous arcuate sidewalls 52b, 52b and include no undercut and have a relatively small angle of approximately 15° with the longitudinal axes of the pinion. In addition the teeth 52, 52 have a small addendum and a large useful dedendum, that is, the difference between the useful height of the teeth and the addendum and is formed with a positive profile deviation. Finally, the pressure angle of the teeth 52, 52, that is, half the angle of the sides of the basic rack profile, is between 15° and 25°. A gear formed in accordance with the disclosure of the Roth patent includes a high beam strength, thus allowing the use of synthetic plastic material for the construction of the gear. Use of synthetic plastic material has the advantages of being somewhat more economical than metal to manufacture and provides less noise during operation. With the pinion construction noted above, a boss 54 is formed on the outer wall of the gear housing 46 and receives the end of the output shaft located in the gear housing 46. Use of the boss 54 allows the pinion 50 to be axially elongated to accomodate the gear teeth 52 without requiring the gear housing 46 to be oversized.

In meshing engagement with the helical pinion 50 is a helical output gear 56, also preferably constructed and arranged in accordance with the above-note Roth patent. The helical output gear 56 is splined or keyed to one end of a rotary shaft 58 carried in a rotary bearing member 60 mounted in an opening 62 in the gear housing 46. The output shaft 58 extends through the rotary bearing member 60 and terminates in a free end having a reduced diameter 61 to which the arm member 14 is secured. In the preferred embodiment of the invention the arm member 14 is formed at one end with an opening that fits over the reduced diameter portion 61 of the rotary shaft 58. At the other end of the arm member 14 there is formed a projecting lug member 64 which is operatively connected to the windshield wiper linkage for driving the wiper arms.

In operation, when motor 10 is energized, it causes the output shaft 28 to rotate. As the output shaft 28 rotates, the helical pinion 50 also rotates driving the helical output gear 56 and the rotary shaft 58. Since the output shaft 58 is fixed to the arm member 14, the latter also rotates and drives the windshield wiper arms through the linkage.

From the description of the preferred embodiment of the invention described above, it can be seen that high step-down ratios can be obtained with a minimum number of gears. For example, use of a two tooth pinion in accordance with the Roth patent and a helical gear formed with 86 teeth provide a stepdown ratio of 43 to 1, which is generally satisfactory for windshield wipers. It has been determined that under stall and shock conditions, the gear mesh radial and tangential forces are relatively high and could cause the teeth 52 of the relatively small pinion 50 to bend out of contact with the helical gear. By mounting the motor 10 between the bearing assembly 30 and the rotary bearing member 42 and by locating the pinion 50 on the other side of the rotary bearing member, the possibility of the pinion bending out of contact with the helical gear 56 is minimized. The gear mesh forces are taken up by the bearing member 42 located closely adjacent the pinion.

Figure 3:
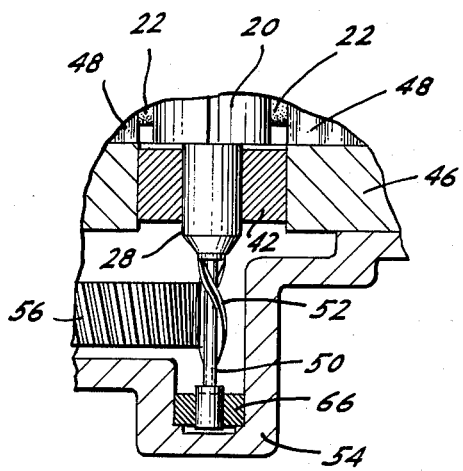

Referring to FIG. 3, another form of pinion bearing arrangement is disclosed. In the embodiment of FIG. 3, the pinion 50 is not cantilevered from the rotary bearing member 42. Instead, still another rotary bearing member 66 is mounted in the boss 54 and receives the end of the output shaft 28 located in the gear housing 46, that is, the end of the output shaft closer to the pinion 50. With this arrangement additional support is provided to take up the gear mesh forces exerted on the pinion 50 and further minimizes the possibility of the pinion bending out of engagement with the helical output gear 56. It should be noted that use of the additional bearing 66 is somewhat more expensive than use of cantilever arrangement and would be used in those applications where the gear mesh forces under shock and stall conditions are deemed excessive.

While in the foregoing there has been described a preferred embodiment of a windshield wiper drive arrangement in accordance with this invention, various modifications and changes may be made without departing from the true spirit and scope of the invention as recited in the appended claims.

I claim:

1. A drive assembly for windshield wipers and the like comprising motor means including a rotatable output shaft operatively connected thereto, said output shaft including a helical pinion rotatable with said shaft and including no more than five helical teeth, said helical pinion being in driving engagement with a helical gear fixed to a rotary shaft whereby said helical pinion drives said helical gear and said rotary shaft, said teeth on said helical pinion being formed with relatively flat apex and continuously arcuate side walls, said teeth further forming a relatively small angle with the longitudinal axis of the gear, an arm member fixed to said rotary shaft for rotation therewith, said arm member including means for connecting said arm member to a windshield wiper linkage whereby rotation of said arm member drives said windshield wipers.

2. A drive assembly in accordance with claim 1 wherein said helical pinion is formed with two teeth.

3. A drive assembly in accordance with claim 1 wherein said means for connecting said arm member to a windshield wiper linkage includes a lug operatively connected to said windshield wiper linkage.

4. A drive assembly in accordance with claim 1 including bearing assemblies in which said rotatable output shaft is mounted, one of said bearing assemblies being at one end of said output shaft and the other of said bearing assemblies being located intermediate the ends of said output shaft, said motor means being located intermediate said bearing assemblies and said helical pinion being located intermediate said other of said bearing assemblies and the other end of said output shaft.

5. A drive assembly in accordance with claim 4 wherein said other end of said output shaft is unsupported whereby said output shaft is cantilevered from said other of said bearing assemblies.

6. A drive assembly in accordance with claim 4 wherein said other end of said output shaft is supported in a bearing assembly.

* * * * *